E. J. HANNOLD.
HOSE COUPLING.
APPLICATION FILED MAR. 10, 1906.
936,866.
Patented Oct. 12, 1909.
2 SHEETS—SHEET 2.
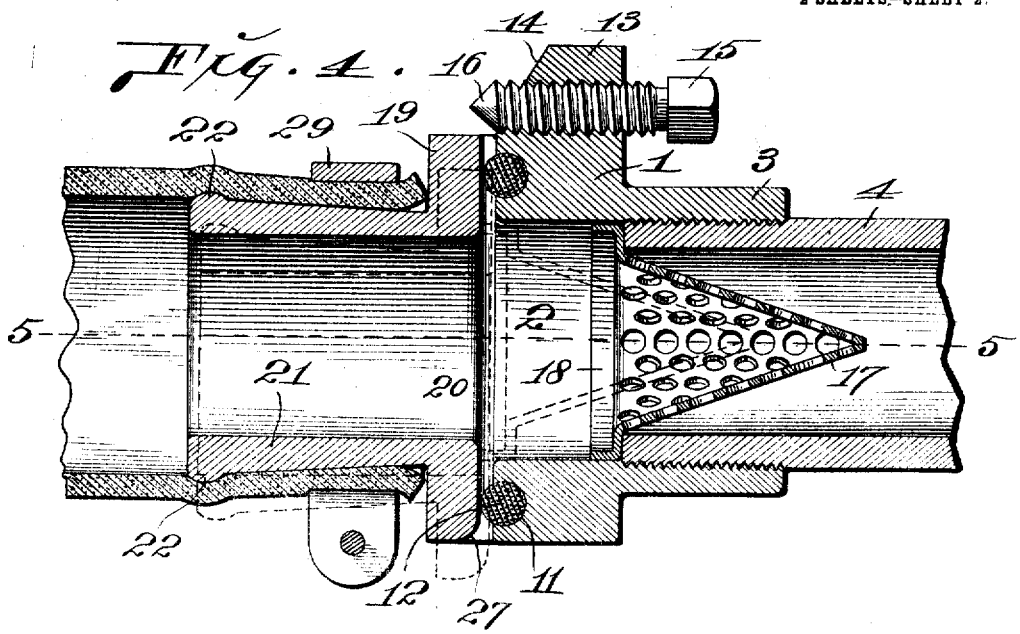
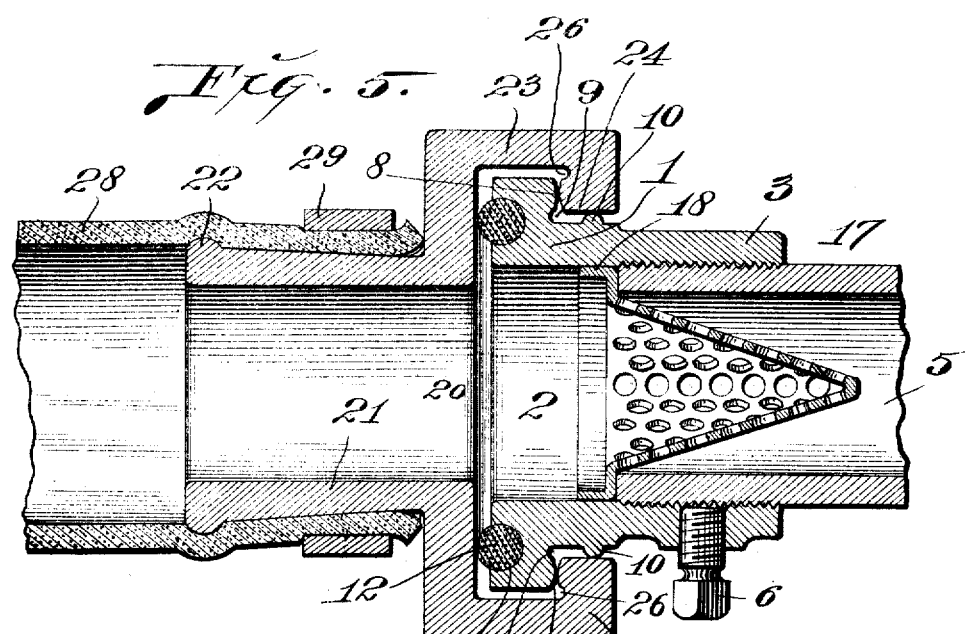

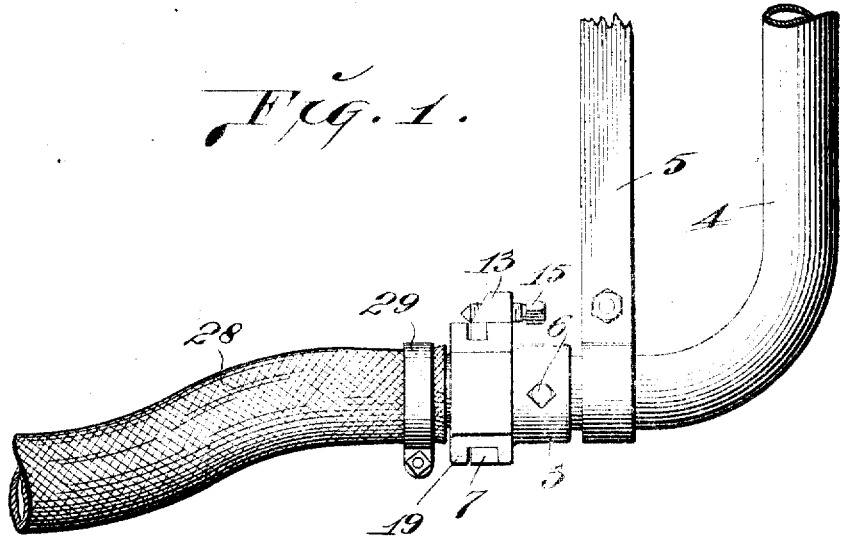
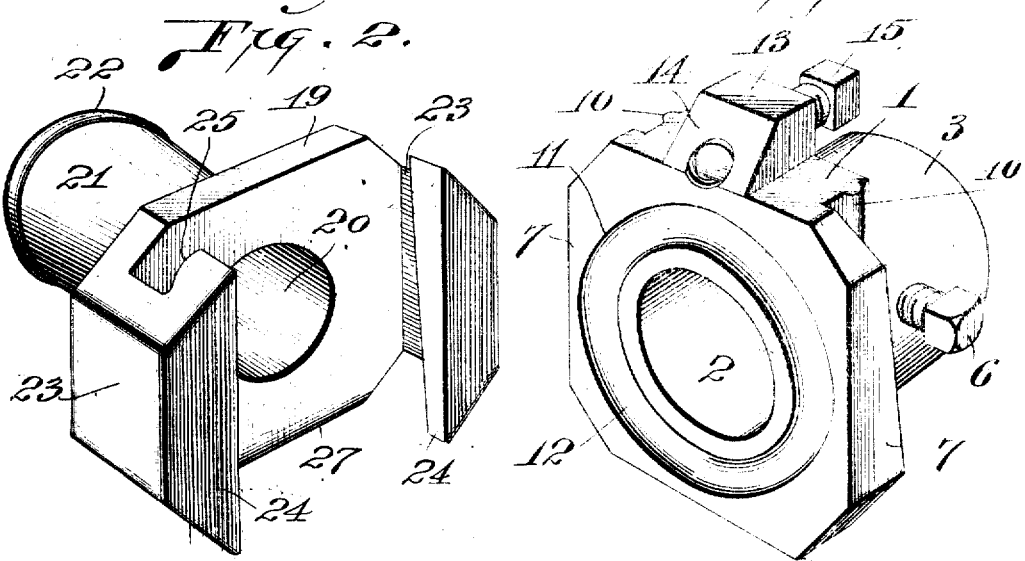

UNITED STATES PATENT OFFICE.

ED J. HANNOLD, OF ST. LOUIS, MISSOURI, ASSIGNOR, BY MESNE ASSIGNMENTS, TO C. M. CLAY.

HOSE-COUPLING.

936,886.　　Specification of Letters Patent.　　Patented Oct. 12, 1909.

Application filed March 10, 1906. Serial No. 305,358.

*To all whom it may concern:*

Be it known that I, ED J. HANNOLD, a citizen of the United States, and resident of St. Louis, Missouri, have invented certain new and useful Improvements in Hose-Couplings, of which the following is a specification, containing a full, clear, and exact description, reference being had to the accompanying drawings, forming a part hereof.

My invention relates generally to hose couplings, and more particularly to a pipe and hose coupling that is located between a locomotive and tender.

The particular object of my invention is to provide a simple coupling which may be very readily coupled or uncoupled, and which when coupled will form a very tight joint to prevent leakage.

A further object of my invention is to provide a coupling of the class described with means whereby the two parts of the coupling are positively locked together while in use so as to guard against accidental uncoupling.

A further object of my invention is to provide means for taking up the wear of the gasket in the coupling in order to always maintain a tight joint between the parts of the coupling, which arrangement is made possible by utilizing the gravity of one of the parts of the coupling and the flexible hose to which it is attached and which leads to the tender.

A further object of my invention is to construct a hose coupling wherein the contacting metal faces are reduced to a minimum in order to minimize the friction between the parts of the coupling, and also to lessen the tendency of the two parts to adhere together by the formation of rust between the contacting faces.

A further object of my invention is to arrange a clearance space between the two sections of the coupling in order to accommodate the wear upon the gasket carried by one of the sections and also to provide for the differences of expansion and contraction of the two sections owing to the normal differences of temperatures in the two parts.

A further object of my invention is to provide a coupling with a strainer which is normally held in a detached position within the coupling, and which may be forced backwardly and forwardly by water or steam pressure to dislodge any impurities that may adhere to the strainer.

To the above purposes, my invention consists of certain novel features of construction and arrangement of parts which will be hereinafter more fully set forth, pointed out in my claims, and illustrated in the accompanying drawings, in which:—

Figure 1 is a side elevation of my improved coupling in position for use upon the end of the hose leading from the tender, and the end of the injector pipe that is carried by the locomotive; Fig. 2 is a perspective view of the female section of the coupling, and which is carried by the end of the flexible hose leading from the tender; Fig. 3 is a perspective view of the male section of the coupling, and which is rigidly fixed on the lower end of the injector pipe; Fig. 4 is a vertical section taken longitudinally through the center of my improved coupling; Fig. 5 is a horizontal section taken on the line 5—5 of Fig. 4.

In the construction of my improved coupling, the male section comprises a vertically disposed rectangular block 1, through which is formed a horizontally extending circular aperture 2, and integral with and projecting rearwardly from the block 1 is a collar 3, which is interiorly screw threaded, and which is screw seated upon the horizontally bent lower end of the metallic pipe 4 that leads up to the injector located upon the locomotive and which forces water into the locomotive boiler. The lower end of this injector pipe is rigidly held in position by means of a suitable bracket 5, and the male portion of the coupling is locked in position on the end of the injector pipe by a set screw 6, which passes through the side of the collar 3 and bears upon the threaded end of said pipe.

Formed integral with the sides of the block 1 and at the front edges thereof are the vertically disposed projections 7, the rear sides of which are inclined so that said projections taper gradually from their lower ends to their upper ends, and said rear faces in addition to being inclined are curved outwardly in cross section, as indicated by 8, and at the point where said rear faces join with the side faces of the block 1 there are formed vertically extending grooves 9, which form rust spaces. Formed integral with the side faces of the block 1 adjacent the rear ends thereof are the vertically extending ribs 10. Formed in the front face of the block 1 and the front faces of the projections 7 is an undercut groove 11, which is concentric with the opening 2, and removably positioned in said groove is a gasket 12, of rubber, or analagous material, round in cross section, and said groove being of such depth as that approximately one-third of this gasket projects beyond the face of the block 1 and projections 7. Integral with the center of the top of the block 1 is an upwardly projecting lug 13 having an inclined front face 14, and passing through a horizontally arranged aperture in said lug is a set screw 15, the forward end 16 of which is pointed, and is adapted when the set screw is moved forward to project beyond the front face of the block 1.

17 designates a conical perforated strainer, which is provided at its large end with an annular flange 18, which is of such size as to slide through the opening 2, and said strainer is so arranged in the male portion of the coupling as that its point projects into the ends of the injector pipe 5.

The female section of the coupling comprises a vertically disposed plate 19, in the center of which is formed an opening 20, and integral with the rear side of said plate is an outwardly projecting collar 21, which is slightly larger at its outer end than at its inner end, and there being an annular rib 22 formed on the extreme outer end of said collar.

Integral with the sides of the plate 19 are the forwardly projecting flanges 23, and the space between said flanges being slightly greater than is the distance between the outside faces of the projections 7. Integral with the front edges of the flanges 23 are the vertically disposed ribs 24, which project inwardly toward one another, and said ribs taper slightly from their upper ends toward their lower ends. The rear faces 25 of these ribs are curved outwardly in cross section in opposition to the curved faces 8 on the projections 7, and formed in the corners where these curved faces 25 join with the inside faces of the flanges 23 are vertically disposed rust grooves 26. The space between the inner faces of the ribs 24 is slightly greater than the distance between the outer faces of the vertically disposed ribs 10 on the sides of the block 1. The lower edge at the front face of the plate 19 is rounded off, as indicated by 27. The end of the hose 28 from the water tank on the locomotive tender is slipped over the enlarged outer end of the collar 21, and is held clamped thereon by a strap 29.

When the parts of my improved coupling are in position upon the hose 28 and the injector pipe 5, and it is desired to unite the parts of the coupling, the set screw 15 is moved rearwardly in the lug 13 until its point passes to the front face of the block 1. The female portion of the coupling is now elevated to a point above the male portion, with the flanges 24 to the rear of the projections 7. The female portion is now allowed to drop by gravity, and is guided so that the front face of the plate 19 passes downwardly until it bears upon the projecting portion of the gasket 12. In so doing, the curved faces 25 of the ribs 24 bear upon the oppositely curved faces 8 on the rear sides of the projections 7, and the inner faces of the ribs 24 bear against the outer faces of the ribs 10.

Owing to the inclination of the curved faces 8 and 25, the plate 19 will gradually be brought closer to the face of the block 1, and this action, combined with the weight of the female portion of the coupling and the weight of the forward end of the flexible hose 28 will compress the gasket to a certain extent and, therefore, a very tight joint is provided between the two parts of the coupling which very effectually prevents the leakage of water passing through the coupling. After the female portion of the coupling has been properly positioned, the set screw 15 is moved forwardly through the lug 13 until its point 16 overhangs the top edge of the plate 19, and, when so positioned, said set screw will lock the female portion of the coupling against accidental withdrawal, and yet said female portion is allowed vertical play, and it may at all times bear downwardly relative to the male portion of the coupling to compress the gasket, or to follow the wear on said gasket, and at all times maintain a perfect joint.

The only parts of the metal of the two sections of the coupling that engage are portions of the curved faces 8 and 25, and portions of the inner faces of the ribs 24 and the ribs 10, and thus the friction of the mating metallic faces is reduced to a minimum, and sufficient clearance between the remaining faces of the adjacent parts is maintained to allow for rust, which would otherwise tend to cause the parts of the coupling to adhere together and prevent their being readily separated. This clearance also provides for the unequal expansion and contraction of the two parts of the coupling, owing to the variations of the temperatures of the two different parts, as for instance, the injector pipe 4 and the male portion of the coupling carried thereby are normally of a higher temperature than the female portion of the coupling, and, therefore, the expansion on the male portion of the coupling is much greater than upon the female portion.

The water in passing from the tender to the locomotive boiler normally maintains the strainer 17 against the end of the injector pipe 5; but when steam is forced backwardly through the injector pipe and through the hose 28 to warm the water in the tank, said strainer is forcibly moved against the plate 19, (as shown by dotted lines in Fig. 4.) and thus has a tendency to dislodge any accumulation that may have lodged upon said strainer.

The female portion of the coupling is free to move downwardly until the upper end of the plate 19 is in alinement with the center of the top of the gasket 12, (as seen by dotted lines in Fig. 4.) and at the same time a water tight joint is maintained between said gasket and the female section. The gasket may readily be renewed when it becomes worn, and should any expansion and contraction take place in said gasket, the gravity of the female portion of the coupling will follow said expansion as it is free to move upwardly and downwardly, yet held against moving too far upwardly by the set screw 15. By providing the under cut groove 11, the gasket 12 will maintain its position in said groove, and said gasket can not be easily dislodged when the parts of the coupling are separated and said gasket is struck by an object.

A coupling of my improved construction is easily applied for use, is easily coupled and uncoupled, and possesses superior advantages in point of simplicity, durability, and general efficiency.

I claim:

1. A hose coupling, comprising a rigidly held member, a gravity member, interlocking flanges formed integral with said members, there being a clearance space between the adjacent faces of said flanges, a gasket interposed between the members, and an adjustable member carried by the rigidly held member in a plane above the top of the gravity member to prevent the accidental dislodgment of said gravity member.

2. A hose coupling, comprising two interlocking members, a compressible gasket partially embedded in the face of one of the members, and the interlocking portions of the two members being so constructed as that the gravity of one of the members is utilized to maintain the face thereof in contact with the gasket, and a set screw passing through the rigid member in a plane above the top of the gravity member to prevent the accidental dislodgment of the gravity member.

3. A hose coupling, comprising a pair of members, interlocking flanges formed on said members, there being a clearance space between the adjacent faces of said flanges and there being a clearance space between the meeting faces of said members; substantially as specified.

4. A hose coupling, comprising a pair of members, interlocking flanges formed on said members, there being a clearance space between said flanges, there being a clearance space between the adjacent front faces of said members; and a set screw passing transversely through one of the members in a plane above the top of the opposite member; substantially as specified.

5. In a hose coupling, constructed with a pair of members, interlocking flanges formed on said members, there being a clearance space between said flanges, and engaging ribs formed on said flanges; substantially as specified.

6. In a hose coupling, constructed with a pair of members, interlocking flanges formed on said members, there being a clearance space between said flanges, engaging ribs formed on said flanges, and a set screw passing transversely through one of the members in a plane above the top of the opposite member; substantially as specified.

7. A hose coupling, constructed with a pair of members, interlocking flanges formed on the sides of said members, the engaging faces of which flanges are oppositely curved transversely and similarly inclined longitudinally, there being clearance spaces formed between the adjacent faces of the flanges, a gasket interposed between the adjacent faces of the members and a set screw passing transversely through one of the members in a plane above the top of the opposite member.

8. A hose coupling, constructed with a pair of members, interlocking flanges formed on said members, and the engaging faces of which flanges are oppositely curved transversely, and similarly inclined longitudinally; substantially as specified.

9. In a hose coupling, a pair of tubular members, interlocking flanges formed integral with the sides of said members, the engaging faces of which flanges are similarly inclined longitudinally and oppositely curved transversely, and a compressible gasket carried by and projecting from the face of one of the members; substantially as specified.

10. In a hose coupling, a pair of tubular members, interlocking flanges formed integral with the sides of said members, the engaging faces of which flanges are similarly inclined longitudinally and oppositely curved transversely, a compressible gasket carried by and projecting from the face of one of the members, and a set screw passing transversely through one of the members in a plane above the top of the opposite member; substantially as specified.

11. In a hose coupling, a pair of tubular members, interlocking flanges formed integral with the sides of said members, the engaging faces of which flanges are similarly inclined longitudinally and oppositely curved transversely, a compressible gasket carried by and projecting from the face of one of the members, a set screw passing transversely through one of the members in a plane above the top of the opposite member, and a conical strainer arranged to slide in one of the tubular members; substantially as specified.

12. In a hose coupling, a pair of tubular members, interlocking flanges formed integral with the sides of said members, the engaging faces of which flanges are simi[larly] inclined, and there being rust grooves for[med] in said members adjacent the flanges; s[ub]stantially as specified.

In testimony whereof, I have signed [my] name to this specification, in presence [of] two subscribing witnesses.

ED J. HANNOLD

Witnesses:
M. P. SMITH,
E. M. HARRINGTON.